United States Patent [19]
Harada et al.

[11] Patent Number: 5,805,169
[45] Date of Patent: Sep. 8, 1998

[54] IMAGE PROCESSING METHOD AND APPARATUS FOR DECIDING WHETHER TO OVERWRITE A COLOR BASED ON A COMPARISON OF STORED COLOR PRIORITIES

[75] Inventors: Takashi Harada, Yokohama; Katsuhiko Sakaguchi, Kawasaki; Shigeki Mori, Koshigaya; Kazuhiro Matsubayashi, Yokohama; Tsunekazu Arai, Tokyo, all of Japan

[73] Assignee: Canon Kabushiki Kaisha, Tokyo, Japan

[21] Appl. No.: 590,436

[22] Filed: Jan. 23, 1996

[30] Foreign Application Priority Data

Jan. 24, 1995 [JP] Japan .................................. 7-008987

[51] Int. Cl.⁶ .................................................... G06T 11/00
[52] U.S. Cl. .............................................................. 345/431
[58] Field of Search .................................... 395/131, 132, 395/133, 134, 135, 523, 524, 525, 326; 345/431–435, 523–525, 326

[56] References Cited

U.S. PATENT DOCUMENTS 4,484,187  11/1984  Brown et al. ........................... 340/703
5,581,670  12/1996  Bier et al. ............................... 395/326

FOREIGN PATENT DOCUMENTS 01-115634  5/1989  Japan .
WO88/01778  3/1988  WIPO .

OTHER PUBLICATIONS

Colin et al. "DeBabelizer Reference Guide" (1993) pp. 16–35, 146,147.

Primary Examiner—Almis R. Jankus
Attorney, Agent, or Firm—Fitzpatrick, Cella, Harper & Scinto

[57] ABSTRACT

According to the invention, when an image is drawn, a check is made to see if the image is overwritten onto an image which has already been inputted and displayed, thereby switching. For this purpose, a color of the image to be drawn and a color of the image which has already been inputted are compared and the image of the color of a higher priority is displayed. According to the invention, there is no need to reset a display priority of the image by a manual operation of the operator in consideration of the priority of the image. When the image is inputted, the priority of the image can be simultaneously decided. As targets to which the invention is applied, there are an image inputted by a hand-writing, an image inputted by a scanner, a character pattern which is generated from a character generator, and the like.

34 Claims, 3 Drawing Sheets

| COLOR (INPUT) | PRIORITY |
|---|---|
| RED | 4 |
| BLUE | 3 |
| GREEN | 5 |
| YELLOW | 2 |
| BLACK | 6 |
| WHITE | 1 |

| COLOR (INPUT) | PRIORITY | COLOR (DISPLAY) | COLOR (OUTPUT) | COLOR (DISPLAY) | COLOR (OUTPUT) |
|---|---|---|---|---|---|
| RED | 4 | | | | |
| BLUE | 3 | | | | |
| GREEN | 5 | | | | |
| YELLOW | 2 | GREEN | OLIVE-GREEN | RED | BROWN |
| BLACK | 6 | | | | |
| WHITE | 1 | | | | |

FIG. 3

| COLOR (INPUT) | PRIORITY |
|---|---|
| RED | 4 |
| BLUE | 3 |
| GREEN | 5 |
| YELLOW | 2 |
| BLACK | 6 |
| WHITE | 1 |

FIG. 4

| COLOR (INPUT) | PRIORITY | COLOR (DISPLAY) | COLOR (OUTPUT) | COLOR (DISPLAY) | COLOR (OUTPUT) |
|---|---|---|---|---|---|
| RED | 4 | | | | |
| BLUE | 3 | | | | |
| GREEN | 5 | GREEN | OLIVE-GREEN | | |
| YELLOW | 2 | | | RED | BROWN |
| BLACK | 6 | | | | |
| WHITE | 1 | | | | |

IMAGE PROCESSING METHOD AND APPARATUS FOR DECIDING WHETHER TO OVERWRITE A COLOR BASED ON A COMPARISON OF STORED COLOR PRIORITIES

BACKGROUND OF THE INVENTION

1. Field of the Invention

The invention relates to an image processing method and apparatus for drawing by using position indicating means such as mouse, pen, or the like.

The invention also relates to an image processing method and apparatus which can edit and output an input image.

2. Related Background Art

Hitherto, when a new image is inputted to an image which has already been inputted, the newly inputted image is overwritten onto the image which has already been inputted.

Hitherto, there is an editing function such that the upper/lower relation when displaying an image which has already been inputted can be changed.

According to the above conventional technique, however, since a display color is unconditionally changed with respect to the overwritten portion, there is a problem such that in the case where an image is erroneously drawn onto a figure to be preserved, the figure to be preserved is erased.

The above conventional technique has a drawback such that the editing operation to change the upper/lower relation when displaying an image after the image was once inputted has to be executed, so that an operability is bad.

SUMMARY OF THE INVENTION

It is an object of the invention to solve the problems of the conventional techniques mentioned above and to provide image processing method and apparatus in which even when an image is overwritten, a figure to be preserved is not erased.

Another object of the invention is to solve the drawbacks of the conventional techniques mentioned above and to provide image processing method and apparatus in which a desired upper/lower relation can be set without needing an editing operation to change a mutual upper/lower relation of images when a plurality of images are displayed.

Still another object of the invention is to provide image processing method and apparatus of a high operability in which by comparing a color set in an image to be drawn and a color of an image that has already been inputted to a position to draw the image and by overwriting an image in which a color of a high priority has been set, the picture of the image and the setting of the priority on the display of the image can be simultaneously performed.

BRIEF DESCRIPTION OF THE DRAWINGS

FIG. 3 is a diagram showing an example of the setting of priorities of colors;

FIG. 4 is a diagram showing an example of a display color change table; and

DETAILED DESCRIPTION OF THE PREFERRED EMBODIMENT

Figure 1:
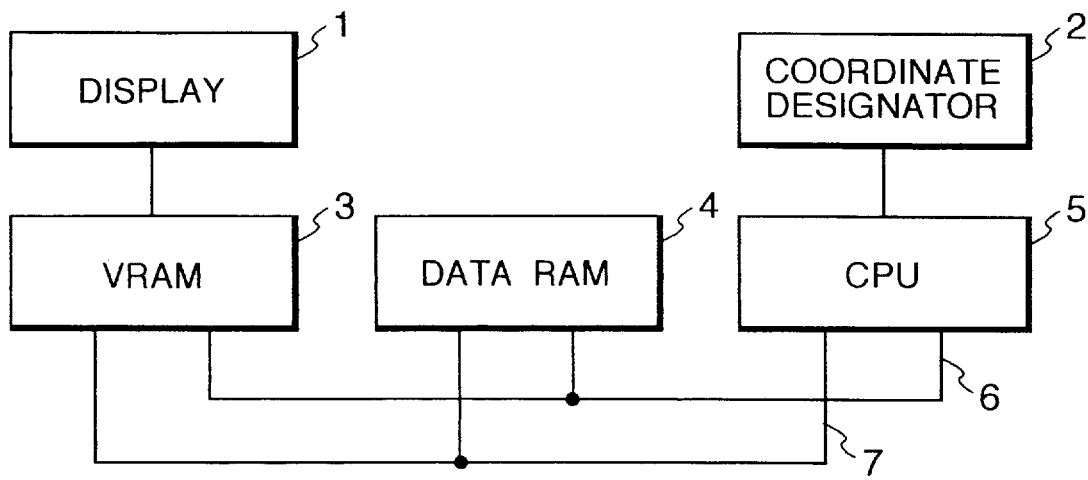
FIG. 1 is a block diagram showing a constructional example of an image processing apparatus according to the invention.
Figure 2:
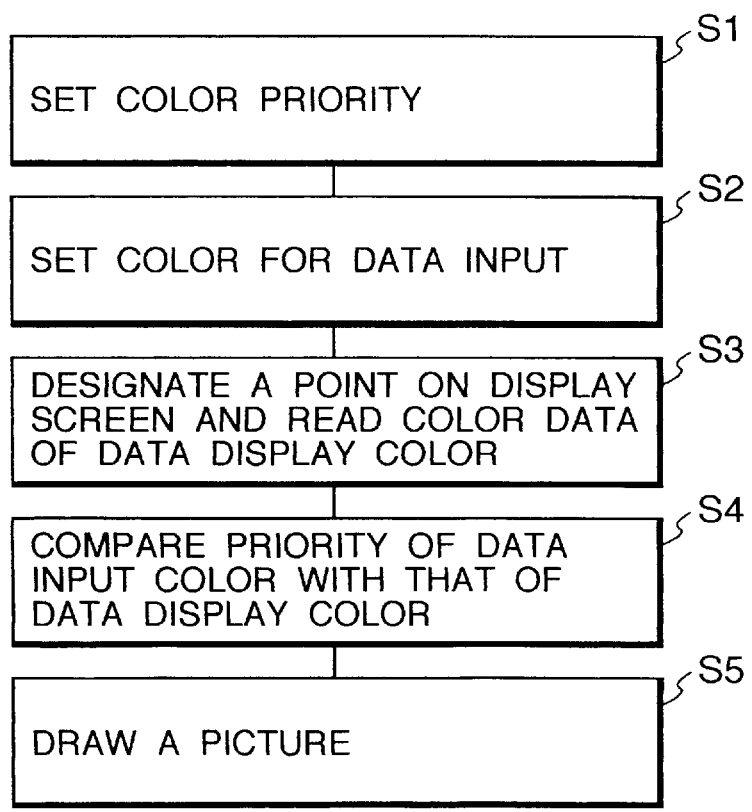
FIG. 2 is a flowchart for a drawing process.

FIG. 1 is a block diagram showing a construction of an image processing apparatus in an embodiment. FIG. 2 is a flowchart showing a drawing process.

In FIG. 1, reference numeral 1 denotes a display for displaying an image as a result drawn, a menu which is necessary for various processes, a cursor of a coordinate designator 2, or the like. The display 1 is constructed by a CRT, a liquid crystal display (LCD), or the like. Reference numeral 2 denotes the coordinate designator such as mouse, pen, or the like to indicate a desired position on the display screen of the display 1. A VRAM 3 is a random access memory for storing data to be displayed. The VRAM 3 stores image data such as a figure or the like to be displayed on the display 1. A data RAM 4 is a random access memory to temporarily store data. The data RAM 4 stores various kinds of parameters such as information of the priorities of the set colors, data of the present drawing color, and the like which are used during the process. A CPU 5 executes and controls various kinds of processes, which will be explained in the embodiment, as shown in the flowchart of FIG. 2. The execution and control of the processes are executed on the basis of a control program stored in an ROM in the CPU 5. An address bus 6 is a bus for flowing address data to designate a position (address) to read or write data in the VRAM 3 and data RAM 4. A data bus 7 is a bus for flowing the data read out from the position designated by the address data flowing on the address bus 6.

A drawing process in the embodiment will now be described in accordance with the flowchart of FIG. 2. In step S1, priorities of colors to be used for drawing are set. The process in step S1 is started by selecting an item "set priority of color" from the menu displayed on the display 1. In the setting process of the priority of the color, since samples of colors which can be displayed, namely, which can be set as drawing colors are displayed on the display screen, the color to set the priority is selected from the sample colors by a method whereby a desired sample is designated by the pen or mouse is clicked or the like. In response to the selecting operation, a subwindow to input the priority to be set to the color is displayed on the display screen. A numerical value indicative of the priority to be set is inputted by using a keyboard (not shown) on the subwindow for setting the priority. In case of inputting the priority, the priority can be also inputted by indicating a soft numerical value key on the display screen by using the pen or mouse so that the color selecting operation can be continuously inputted.

In step S1, the setting or changing operation of the priority of a new color is repeated with respect to each color until the operator instructs the end of setting. FIG. 3 is a table showing the priorities of the colors set in step S1. The table is stored in the data RAM 4. In FIG. 3, the priorities 4, 3, 5, 2, 6, and 1 are set with regard to red, blue, green, yellow, black, and white selected from the colors which can be displayed on the display 1, namely, which can be set in an image to be drawn by the coordinate designator 2. The smaller the numerical value is, the higher the priority becomes. In the example of FIG. 3, the priority of white is the highest and the priority of black is the lowest. In this case, the image of white is displayed over the images of all of the other colors.

When an item of "end" is designated by the operator and the priority setting process of the color (S1) is finished, the priorities of the colors set until this time point are stored into the data RAM 4 and a setting process of a drawing color (step S2) is started.

Figure 5:
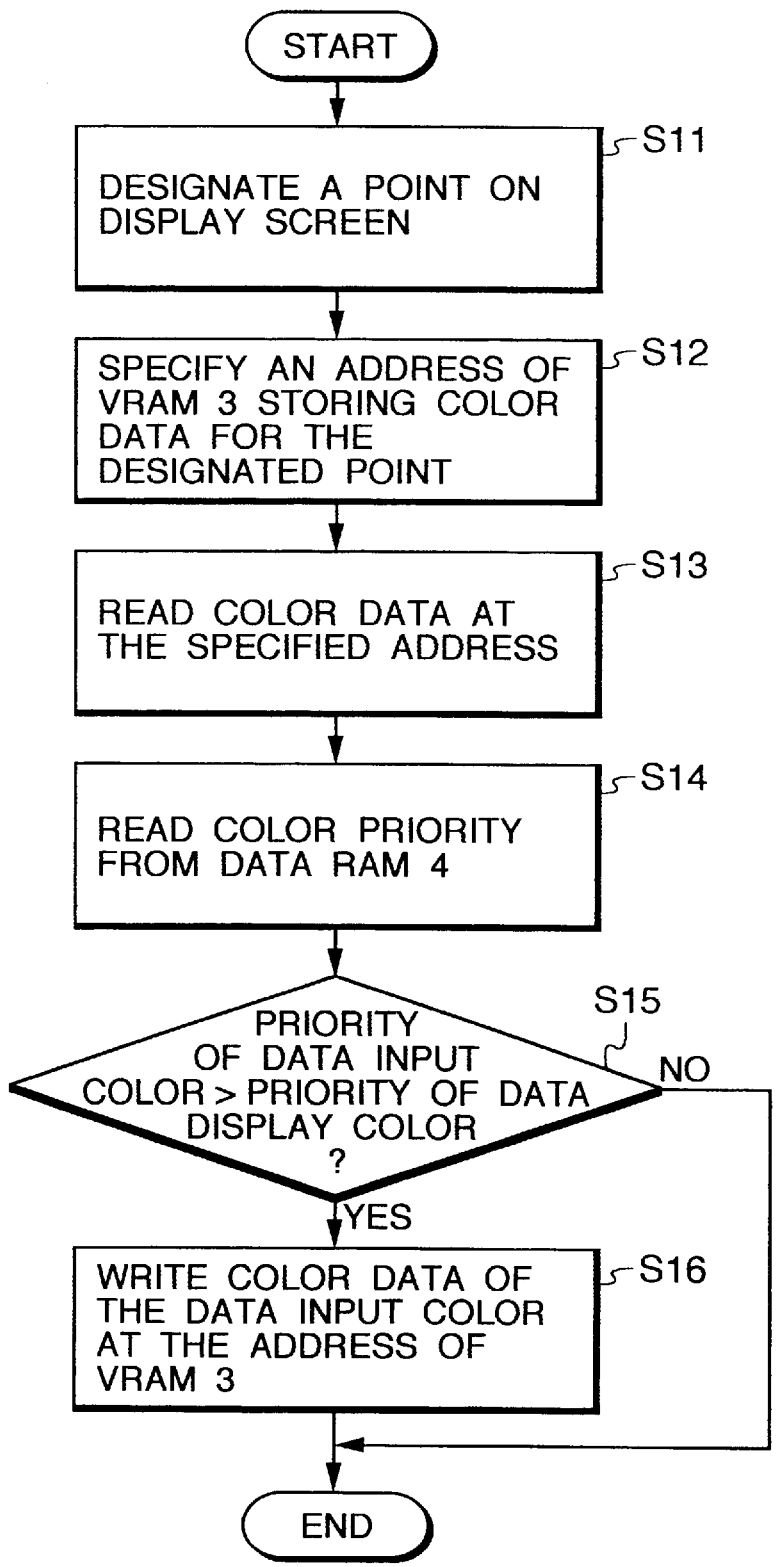
FIG. 5 is a flowchart for a detailed drawing process.

The drawing color setting process is also started by designating an item of "set input color" by the operator by using the pen or mouse. The color set in step S2 and the priority data of such a color which has been stored in the data RAM 4 are stored into the data RAM 4. After the color was set in step S2, a picture which is inputted by the pen, mouse, or keyboard is displayed on the display screen by the designated color. The drawing of the picture is executed in steps S3 and S4. The detailed process of the drawing portion is shown in a flowchart of FIG. 5.

In step S3, when an arbitrary point on the display screen is designated by the coordinate designator 2 or the keyboard (S11), the address in the VRAM 3 to store the color data of the designated point is indicated by the CPU 5 through the address bus 6 (S12). The color data stored in the address is sent to the CPU 5 through the data bus 7 (S13). The CPU 5 reads out the priority of the color data sent and the priority of the color to be inputted from the data RAM 4 (S14) and compares the values of those two priorities (S15). As a result of the comparison, when the priority of the color to be inputted is higher than the priority of the color displayed, the CPU 5 writes the color data of the color to be inputted into the address corresponding to the point designated in the VRAM 3 (S16). On the contrary, when the priority of the color displayed is higher than the priority of the color to be inputted, the data in the address corresponding to the point designated in the VRAM 3 is held without changing. The data in the VRAM 3 is displayed on the display 1 (S5).

By the above procedure, a process such that the overwriting is enabled or disabled by allocating the priority to the color can be performed. Even if an image is overwritten, a picture to be preserved is not erased.

In the above description, the overwriting process is executed with attention paid to only the priority of the color. The relation between the color and the priority in this instance is as shown in, for example, a table of FIG. 3. By expanding the table as shown in FIG. 4 and by changing output color information for the color information which was read out, not only a judgment about whether the drawn data is overwritten or not in step S4 of the flowchart of FIG. 2 is performed but also the color in case of overwriting can be changed.

Explanation will now be made with respect to FIG. 4 as an example. When the color which is inputted and is set in step S2 at present is yellow and the color which was read out and displayed in step S13 is green, olive-green is outputted from FIG. 4 and the display color is changed from green to olive-green. Similarly, when the color to be inputted is yellow and the color which was read out is red, the color to be outputted is brown.

On the other hand, when the color in which the color change is not set in the table such as red, blue, or the like in FIG. 4 is inputted, the display is determined in accordance with the priority in a manner similar to the case of using the table of FIG. 3. For example, when the color to be inputted is yellow and the read-out color is white, since the priority of white is higher, white is displayed as it is. When the read-out color is blue, since the priority of yellow is higher, the display color is changed from blue to yellow. Thus, in the case where the table is set as shown in FIG. 4, so long as the color to be inputted other than yellow is set, the display color is decided by the priority with the read-out color.

According to the embodiment as described above, by expanding the table describing the relation between the color and the priority, when overwriting, the process such that the display color can be changed on the basis of the relation between the display color and the input color or the overwriting cannot be performed can be executed. It is possible to construct in a manner such that even if an image is overwritten, the picture to be preserved is not erased. As for the image formed by the drawing process described above, the data that is similar to that stored in the VRAM 3 is outputted from the printer (not shown) and the image can be obtained as a desired original. As a printer, a printer such as LBP, ink jet printer, or the like which can output a color image or a printer which can output a gray scale can be used.

Although the embodiment has been described with respect to the example in which the picture is inputted by the pen, mouse, keyboard, or the like, the invention is not limited to it. For example, the invention can be also applied to the case where the image inputted through a scanner or a communication line is overwritten to the image which has already been inputted and the resultant image is inputted. In this case, with respect to the newly inputted image (S11), VRAM data about each dot (S12) of such an image is read out (S13), the priority is read out (S14), and a judgment about the input color and the display color is performed (S15). As an input color, so long as the input image is a color image, it is sufficient to read out the color of the dot and to store into the data RAM 4 in step S11. When the image is inputted, so long as the color is designated for the whole image (S2) irrespective of the color set in the input image, it is sufficient to store the set color into the data RAM 4.

It will be understood that the input image may be a character pattern image which is generated from a character generator. In this case as well, when the character pattern of designated color and size and font style is generated from the character generator and written into the VRAM 3, it is sufficient to read out the data from the VRAM 3 (S13) with respect to each dot (S12) to develop the character pattern and to execute the processes in steps S14 to S16.

What is claimed is:

1. An image processing apparatus comprising:
   storing means for storing an image;
   indicating means for indicating a position in said storing means;
   reading means for reading a color of the image stored in said storing means at the position indicated by said indicating means;
   setting means for setting a color to perform data drawing;
   memory means for storing, for each of a plurality of colors, a priority set for the color;
   comparing means for comparing the priority stored in said memory means that is set for the color read out by said reading means with the priority stored in said memory means that is set for the color set by said setting means; and
   deciding means for, in response to a comparison made by said comparing means, deciding whether or not the color set by said setting means is to be overwritten at the position indicated by said indicating means.

2. An apparatus according to claim 1, wherein said memory means stores a table in which a plurality of color information and the priority of each color are made correspond.

3. An apparatus according to claim 1, further having image input means for inputting the image.

4. An apparatus according to claim 3, wherein said image input means is a pen.

5. An apparatus according to claim 3, wherein said image input means is a mouse.

6. An apparatus according to claim 3, wherein said image input means is a keyboard.

7. An apparatus according to claim 1, wherein said indicating means is a pen.

8. An apparatus according to claim 1, wherein said indicating means is a mouse.

9. An apparatus according to claim 1, wherein said indicating means is a keyboard.

10. An apparatus according to claim 1, wherein said image is a character pattern.

11. An apparatus according to claim 1, further having a printer to output the image displayed on said display means.

12. An apparatus according to claim 1, further having an ink jet printer to output the image displayed on said display means.

13. An image processing method comprising the steps of:

setting a color for performing data drawing;

indicating a position in a storage device storing an image;

reading a color of the image stored in the storage device at the indicated position;

comparing a stored priority that is set for the color read in said reading step with a stored priority set for the color set in said setting step; and deciding, in response to a comparison made in said comparing step, a color to be outputted to a display means at the position indicated in said indicating step.

14. A method according to claim 13, wherein said comparing step is performed in accordance with a table in which a plurality of color information and the priority of each color are made to correspond and which has been previously stored.

15. A method according to claim 13, wherein an image to be displayed on said display means is inputted from a pen.

16. A method according to claim 13, wherein an image to be displayed on said display means is inputted from a mouse.

17. A method according to claim 13, wherein an image to be displayed on said display means is inputted from a keyboard.

18. A method according to claim 13, wherein said indication is inputted from a pen.

19. A method according to claim 13, wherein said indication is inputted from a mouse.

20. A method according to claim 13, wherein said indication is inputted from a keyboard.

21. A method according to claim 13, wherein an image to be displayed on said display means is a character pattern.

22. A method according to claim 13, further comprising the step of outputting an image displayed on said display means using a printer.

23. A method according to claim 13, further comprising the step of outputting an image displayed on said display means using an ink jet printer.

24. A machine-readable memory medium containing program codes for causing a processing unit to control an apparatus to perform the steps of:

setting a color for performing data drawing;

indicating a position in a storage device storing an image;

reading a color of the image stored in the storage device at the indicated position;

comparing a stored priority that is set for the color read in said reading step with a stored priority set for the color set in said setting step; and deciding, in response to a comparison made in said comparing step, a color to be outputted to a display means at the position indicated in said indicating step.

25. A medium according to claim 24, wherein the comparison is performed in accordance with a table in which a plurality of color information and the priority of each color are made to correspond and which has been previously stored.

26. A medium according to claim 24, wherein an image to be displayed on the display means is inputted from a pen.

27. A medium according to claim 24, wherein an image to be displayed on the display means is inputted from a mouse.

28. A medium according to claim 24, wherein an image to be displayed on the display means is inputted from a keyboard.

29. A medium according to claim 24, wherein the indication is inputted from a pen.

30. A medium according to claim 24, wherein the indication is inputted from a mouse.

31. A medium according to claim 24, wherein the indication is inputted from a keyboard.

32. A medium according to claim 24, wherein an image to be displayed on the display means is a character pattern.

33. A medium according to claim 24, further comprising codes for controlling the apparatus to perform the step of outputting an image displayed on the display means using a printer.

34. A medium according to claim 24, further comprising codes for controlling the apparatus to perform the step of outputting an image displayed on the display means using an ink jet printer.

* * * * *

UNITED STATES PATENT AND TRADEMARK OFFICE
CERTIFICATE OF CORRECTION

PATENT NO. : 5,805,169

DATED : September 8, 1998

INVENTOR(S) : TAKASHI HARADA, ET AL.

It is certified that error appears in the above-identified patent and that said Letters Patent is hereby corrected as shown below:

COLUMN 4

Line 54, "corre-" should read --to corre---.

Signed and Sealed this

Twentieth Day of April, 1999

Attest:

Q. TODD DICKINSON

Attesting Officer   Acting Commissioner of Patents and Trademarks